Dec. 27, 1966 C. M. SLAVENS 3,295,142
COLOR TRACE OSCILLOGRAPH
Filed Oct. 16, 1964 2 Sheets-Sheet 2

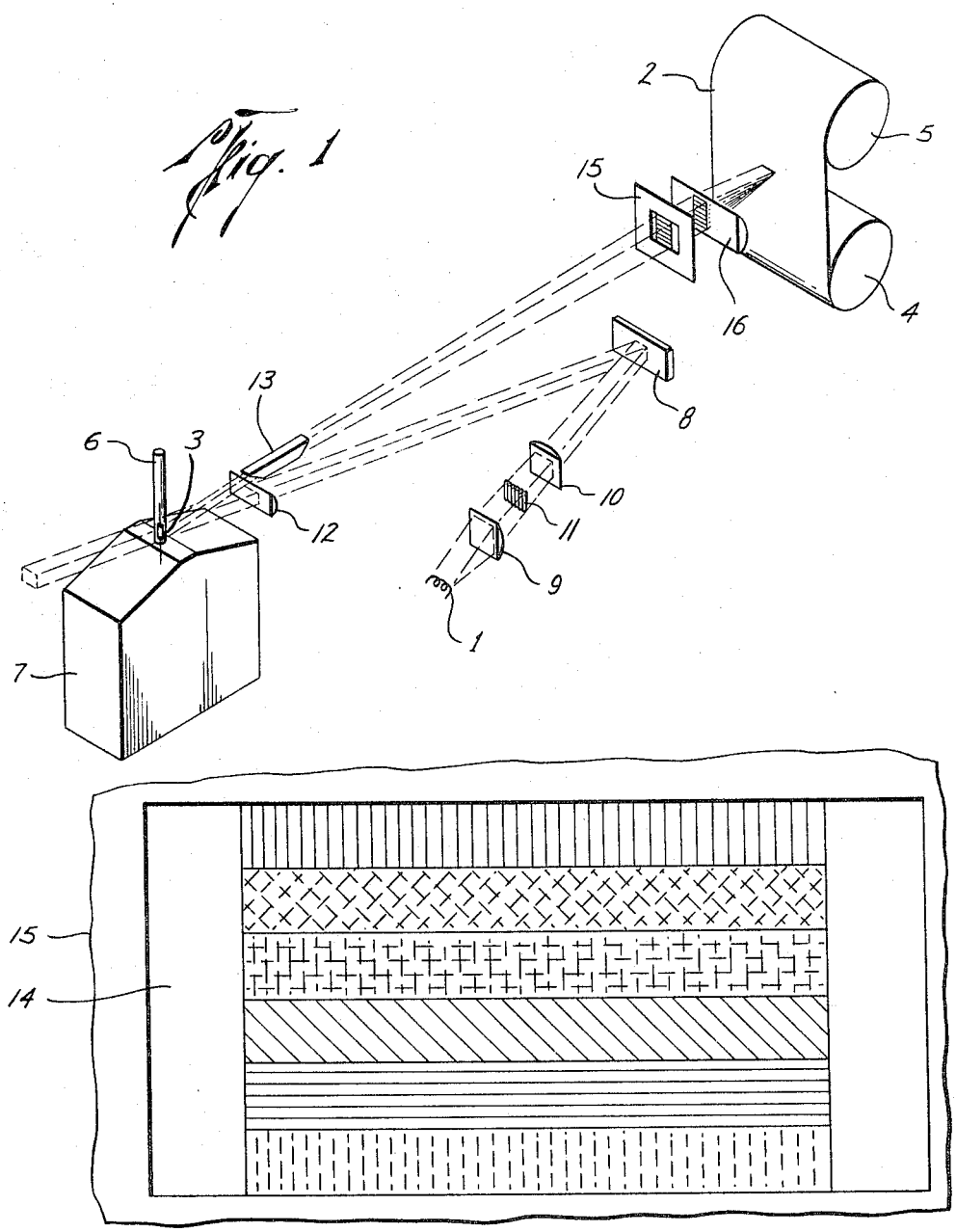

C. M. Slavens
INVENTOR.

BY
ATTORNEY

3,295,142
COLOR TRACE OSCILLOGRAPH
Clyde M. Slavens, 3827 Richmond Ave.,
Houston, Tex. 77027
Filed Oct. 16, 1964, Ser. No. 404,354
1 Claim. (Cl. 346—109)

This invention relates to oscillograph cameras and more particularly to improved instrumentation for recording in easily readable color the amplitudes of light beam oscillations which vary in extent as a measure of change in detected energy.

Among its uses, the invention is adapted for seismic work. Heretofore, surveys have employed a galvanometer whose pivoted mirror is deflected in response to microphone transmitted signals and directs a narrow light beam to a traveling light sensitive sheet for recording detected vibration as a zigzag trace. For oil seeking exploration, the survey equipment includes a bank of galvanometers, each responsive to a different geophone in a spread so as to mark side by side traces in time-amplitude-velocity relation and for logging significant vibrations reflected from spaced apart points along each interface of successive earth strata. On occasion, traces obtained in successive tests on a location are stacked or superposed for verification and clear definition. Experienced skill is required for reliable interpretative reading of wiggle-line seismograms and has stimulated efforts to devise alternatives such as contrasting light and heavy images related to vibration amplitude, but black and white shading intensities lack precise clarity. For simplifying more positive evaluation by the production of seismograms which can be quickly and readily scrutinized through utilization of colors is a primary object of this invention.

A further object is to provide for separation of an oscillograph light beam into discriminate color zones extending transversely to the path of oscillation across a mask having a light passing aperture whose opening in the beam oscillating direction is smaller than the range of oscillation whereby those colors which reach a traveling light sensitive strip record oscillation characteristics inclusive of amplitude, velocity and time sequence.

Other objects and advantages of the invention will become apparent from the following specification having reference to the accompanying drawings, wherein FIG. 1 is a diagrammatic perspective view of a seismograph system embodying the invention;

FIG. 2 is a greatly enlarged view of a small fragment of a mask and the aperture therethrough for use in the system of FIG. 1;

Figure 3:
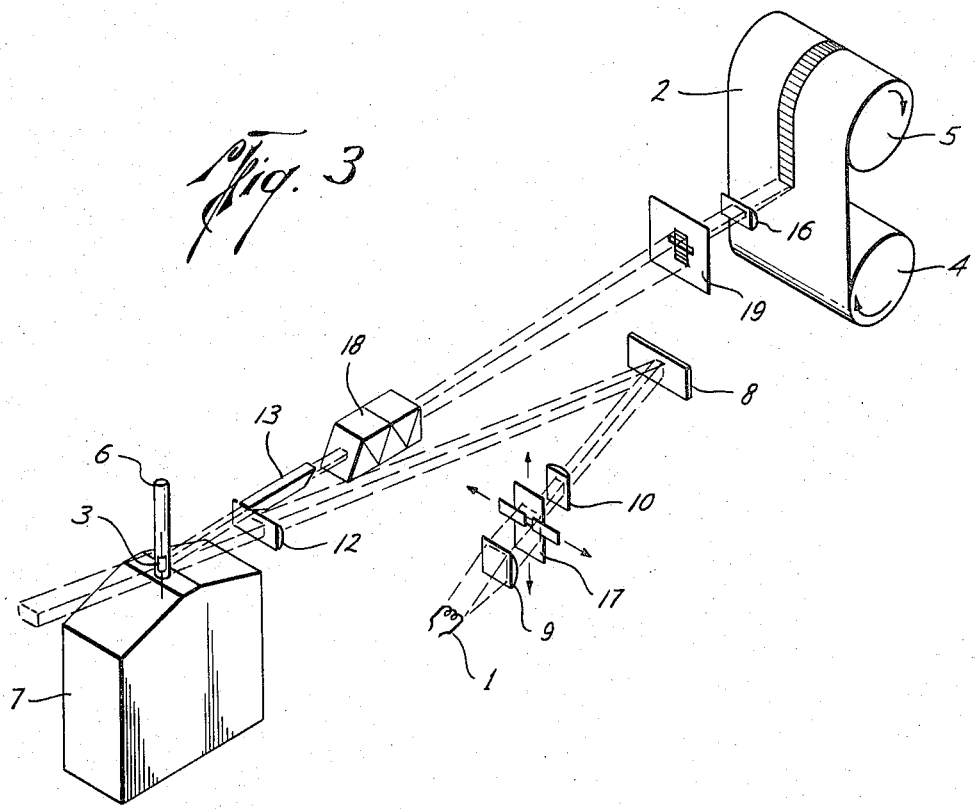
FIG. 3 is a diagrammatic perspective view of an oscillograph system with an alternative arrangement of parts.
Figure 4:
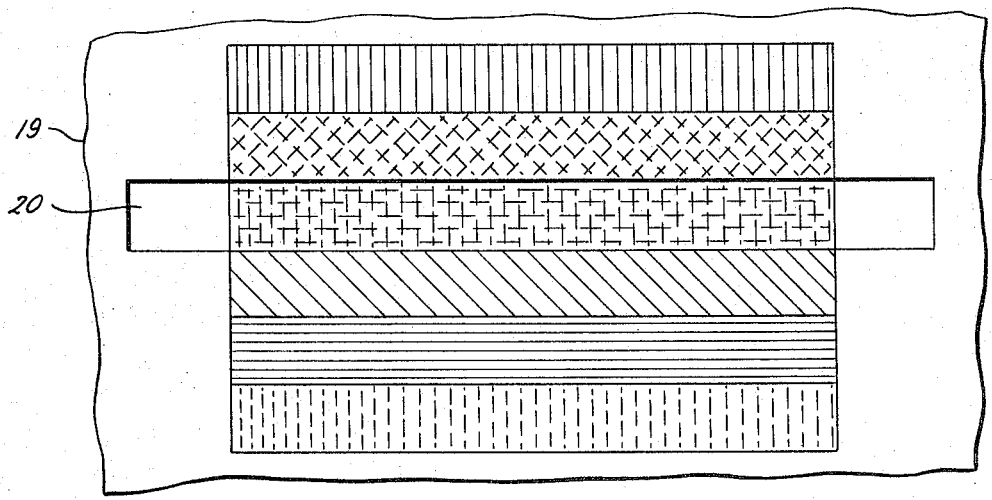
FIG. 4 is an enlarged view of a mask for use with the system of FIG. 3.

Shown in the drawings are conventional elements of a seismograph consisting primarily of a light source or projection lamp 1, a traveling light sensitive strip 2 and an oscillatory cylindrical mirror 3 which directs light from the lamp 1 to the recording strip 2. As is customary, the opposite ends of the strip 2 are attached to unwinding and winding rolls 4 and 5 arranged to position the strip extent between the rolls in a plane parallel with the axis of mirror oscillation and to move the strip at a constant rate in a travel direction corresponding to the direction of oscillation of the beam at its impingement on the strip. The oscillatory mirror 3 is a part of a rock shaft 6 of a galvanometer unit 7 and is oscillated in response to and in correspondence with voltage pulse signals transmitted from a geophone connected thereto. For convenience, the oscillograph illustrated has a single galvanometer and it will be understood that a set of galvanometers, each responsive to a different geophone, may be provided for placing traces side by side on the same record sheet.

A mirror 8 is interposed between the galvanometer mirror 3 and the lamp 1 to give a more compact assembly and directs the light beam to the galvanometer mirror after the beam from the lamp has passed through a pair of condensing lenses 9 and 10 having their axes at right angles to one another.

In the path of the beam from the lamp 1 and spanning the entire transverse area of the beam, as seen in FIG. 1, is a set 11 of color filters in the form of vertically disposed solid cylindrical rods, each differing as to color transparency. The filters separate the white light into side by side zones or bands containing vertical lines of spectrum colors such as red, orange, yellow, green, blue and violet. These segregated colors in the beam reach the mirror 3 through a projection lens 12 and are reflected toward the light sensitive strip 2 after first passing in succession through a longitudinally disposed dove prism 13 having its fore and aft faces inclined at approximately forty-five degrees to the prism axis for rotating the image substantially ninety degrees, and an aperture 14 in a mask 15 and a condensing lens 16 which converges the beam vertically to a narrow horizontal line on the surface of the strip 3.

In the vertical direction of beam oscillation, the mask aperture 14, as best seen in FIG. 2, is of a size predetermined to equal the vertical height of the beam at the mask 15 so as to pass all color zones of the beam at a given angular position of the galvanometer mirror and this means that the aperture is smaller than the range through which the beam can be swung upon galvanometer oscillation. With the aperture 14 positioned in relation to the zero or centered galvanometer mirror 3 so as to pass all color zones and the beam in its entirety as illustrated in FIG. 2, then, because of the action of the condensing lens 16, all zones of color will merge or combine as a white image on the photo strip 2.

In operation, any responsive operation of the galvanometer 3 will swing the projected beam vertically across the face of the mask 15 and such swing in either direction screens or blanks the color line bands successively from one or the other of the endmost of the group of successive color zones. Thus, the combination of colors reaching the photo strip 2 will vary in accordance with the angular position of the beam at any instant and progressively change the color of the image for indicating amplitude and the duration of change will indicate velocity. More particularly, on an upward swing from center, the successive screening of color zones will be from red at one end toward violet and on the return downward swing, the last color zones which were blanked out will return to aperture alignment and with continued swing beyond center, the blanking off of color zones will be from the violet end. When completed, the seismogram is a variegated trace with distinctive colors standing out in acutely discernible coding for instant recognition and identification of seismic data.

Many of the components previously described are contained in the embodiment of FIG. 3 and are designated by like reference characters. Between the lenses 9 and 10, there is preferably inserted an adjustable screen 17 for control of light spread and in place of using color filters, there is shown a direct vision prism 18 for effecting separation of the spectrum. Conveniently, this prism 18 is placed just ahead of the mask 19 and in the beam path beyond the dove prism 13. In this instance, the mask 19 has its aperture constituted by a narrow slit 20 extending normal to the direction of beam oscillation and presenting an opening of given size in the direction of beam oscillation and the aperture size is so selected as to be considerably less than beam height and range of beam oscillation and for restricting color line band passage to fewer than the whole spectrum and preferably to approximately the most prominent lines of each of the more distinctive color zones.

When the mask slit 20 is centered at zero beam position, the successive color zones on either side of the slit will be excluded from the light sensitive strip 2 but will come successively into alignment with the slit during oscillation and record on the traveling slip the full cycles of oscillation, each in progressively changing colors as indicative of amplitude and with respect to color band intervals as indicative of velocity. In the event the printing of amplitudes in relative half cycles is preferred, that can be accomplished by adjusting mask position so that the narrow slit is offset above or below the beam axis at zero setting and either at or just outside the endmost color band. Also, it will be feasible to locate the narrow slit to extend vertically in the mask or in the direction of the galvanometer rock axis and to omit the dove prism 13 so that the beam oscillates horizontally across the mask, in which case successive back and forth strokes of the oscillating beam will be printed as a wiggle trace form of differing color zones in lateral progression.

Traces obtained on successive tests can be stacked by running and rerunning a light sensitive strip from the same starting point. Color portions of superposed traces may be alike or they may be mixed, depending upon galvanometer response at the same point in each of the several tests. As examples of mixture combinations, there may be considered like time fragments of several traces in any differing color sequence. Thus, the following chart is illustrative of a small fragment of sequential colors in each of several separate traces and with the letters R, O, Y, G, B and V being used for colors red, orange, yellow, green, blue and violet, and with the numerals identifying different traces:

| 1 | 2 | 3 | 4 | 5 | n |
|---|---|---|---|---|---|
| R | O | Y | R | V | R |
| O | Y | G | O | B | R |
| Y | G | B | Y | G | Y |
| G | B | V | G | Y | G |
| B | V | B | B | O | B |
| V | B | G | V | R | R |
| B | G | Y | Y | O | G |
| G | Y | O | O | Y | R |
| Y | O | R | R | G | G |
| O | R | O | Y | B | O |
| R | O | Y | R | V | R |

When any of the foregoing trace fragments are stacked one on another various mixture combinations will result on the strip and a few of such mixtures will be as follows:

| 1 & 2 | 1 & 2 & 3 | 3 & 4 | 3 & 4 & n |
|---|---|---|---|
| R—O | R—O—Y | Y—R | Y—R—R |
| O—Y | O—Y—G | G—O | G—O—R |
| Y—G | Y—G—B | B—Y | B—Y—Y |
| G—B | G—B—V | V—G | V—G—G |
| B—V | B—V—B | B—B | B—B—B |
| V—B | V—B—G | G—V | G—V—R |
| B—G | B—G—Y | Y—B | Y—B—R |
| G—Y | G—Y—O | O—G | O—G—G |
| Y—O | Y—O—R | R—Y | R—Y—G |
| O—R | O—R—O | O—O | O—O—O |
| R—O | R—O—Y | Y—R | Y—R—R |

The foregoing specification has been directed to specific detail and the invention is not necessarily limited but rather is susceptible to various modifications and substitutions such as come within the scope of the appended claim.

What is claimed is:

In a color trace oscillograph, a traveling light sensitive strip, a signal actuated oscillatory mirror mounted to direct a light beam toward the strip and to swing the beam in a path transverse to the direction of strip travel, a pair of prisms arranged in spaced apart and series relation between the mirror and the strip and one prism being constructed to rotate the light beam substantially ninety degrees and the other prism being constructed to separate the beam into different color zones, a beam condensing lens positioned ahead of the strip and arranged to focus the beam to substantial line impingement on the strip and a mask mounted in advance of said condensing lens and provided with a light passing aperture of predetermined size smaller than the range of beam oscillation at the mask whereby the screening of beam portions during beam oscillation is recorded by colored light passing through the aperture and the recorded color contrasts are significant of amplitudes of successive oscillations of the beam.

References Cited by the Examiner

UNITED STATES PATENTS

| | | | |
|---|---|---|---|
| 548,701 | 10/1895 | Crehore | 346—108 |
| 1,350,143 | 8/1920 | Donisthorpe | 352—85 |
| 2,095,317 | 10/1937 | Dimmick | 179—100.3 |
| 2,443,258 | 6/1948 | Lindenblad | 88—1 |
| 2,587,219 | 2/1952 | Rettinger | 179—100.3 |
| 2,769,683 | 11/1956 | Skelton | 346—109 |
| 2,937,915 | 5/1960 | Peterson | 346—109 |
| 2,944,620 | 7/1960 | Van Dijck | 181 |
| 3,011,856 | 12/1961 | Palmer et al. | 346—109 |

RICHARD B. WILKINSON, *Primary Examiner.*

LOUIS CAPOZI, *Examiner.*

J. W. HARTARY, *Assistant Examiner.*